United States Patent

[11] 3,633,764

[72] Inventors Edwin Nordmann;
 Tischer Siegfried, both of Dresden, Germany
[21] Appl. No. 4,922
[22] Filed Jan. 22, 1970
[45] Patented Jan. 11, 1972
[73] Assignee VEB Mikromat Dresden
 Dresden, Germany

[54] TOOL-CHANGING MECHANISM
 15 Claims, 7 Drawing Figs.
[52] U.S. Cl..................................................... 214/1 BD,
 214/147 T
[51] Int. Cl...................................................... B23q 7/02
[50] Field of Search............................................ 214/1 BC, 1
 BD, 1 BH, 1 BV, 147 T, 147 R

[56] References Cited
 UNITED STATES PATENTS
2,929,499 3/1960 Turner ......................... 214/1 BD X
3,348,298 10/1967 Sedwick ....................... 214/1 BD X Primary Examiner—Gerald M. Forlenza
Assistant Examiner—George F. Abraham
Attorney—Michael S. Striker ABSTRACT: A tool-changing mechanism which transports tools between an indexible magazine mounted on a stationary support and a tool spindle mounted on a holder which is movable toward and away from the magazine support. The mechanism comprises an expandable and collapsible linkage having first and second pivots respectively mounted on the support and on the holder and two links which respectively connect the first and second pivots with a third pivot parallel to the other two pivots. The third pivot carries an oscillatable arm for a gripping unit which can transport tools between the magazine and the spindle holder in response to angular movement of the arm through an angle whose magnitude is a function of the distance between the magazine and the spindle holder.

INVENTOR.
EDWIN NORDMANN
BY SIEGFRIED TISCHER

INVENTOR.
EUGEN NORIMANIU
SIEGFRIED TISCHER
BY
Michael S. Striker
Attorney

TOOL-CHANGING MECHANISM

BACKGROUND OF THE INVENTION

The present invention relates to tool-changing mechanisms, and more particularly to improvements in mechanisms which are utilized to transport tools between the tool magazine and the tool spindle or spindles of a machine tool or the like. Still more particularly, the invention relates to improvements in tool-changing mechanisms which can be utilized in automatic machine tools wherein the movements of movable parts are programmed so that they are performed in accordance with a predetermined schedule.

It is already known to provide a drilling, boring, milling, or other material-removing machine with a tool-changing mechanism which serves to transport tools between a magazine and one or more tool spindles. In many instances, such conventional tool-changing mechanisms effect a change in orientation of tools during transport between the magazine and the material-removing station; for example, the tool must be caused to change its orientation by turning about one, two, or more axes. As a rule, a conventional tool-changing mechanism comprises a device which transports tools between the magazine and the tool spindle, between the magazine and a station which is located at a fixed distance from the tool spindle, or between the tool spindle and a station which is located at a fixed distance from the magazine. When the transfer of tools does not take place directly from the magazine to the tool spindle or vice versa, the tool-changing mechanism must be provided with one or two auxiliary tool-changing devices which transport tools between the tool spindle and the associated station or between the magazine and the associated station. Such tool-changing mechanisms can operate properly only when the tools are transported through fixed distances, i.e., through a fixed distance from the tool magazine to the tool spindle, through a fixed first distance from the magazine to a first station and through a fixed second distance from the first station to the spindle, through a fixed first distance from the magazine to a second station and through a fixed second distance from the second station to the spindle, or in three stages, namely, from the magazine to a first station, from the first station to a second station, and from the second station to the spindle (or vice versa). This can be achieved only if the tool magazine is movable so that it can follow movements of the tool spindle, or if the tool spindle is movable to a predetermined tool-changing position in which it is located at a fixed distance from the magazine. Such tool-changing mechanisms are not entirely satisfactory because the transport of a bulky tool magazine consumes much time and energy and because the transport of the tool spindle to a predetermined position prior to each exchange of tools also consumes much time. If the spindle is to move to a predetermined position prior to an exchange of tools, the machine must be provided with additional programming means and drive means to effect such movement of the tool spindle in a fully automatic way. The most serious drawback of presently known tool-changing mechanisms is that an exchange of tools consumes too much time so that the output of the machine is overly dependent on the frequency at which the tools must be exchanged in the course of a single machining operation or in the course of a series of successive machining operations.

SUMMARY OF THE INVENTION

It is an object of our invention to provide a tool-changing mechanism for drilling, boring or like machines which is constructed and assembled in such a way that it can transport tools between a stationary tool magazine and one or more material-removing stations in a novel and timesaving manner.

Another object of the invention is to provide a tool-changing mechanism which can be readily incorporated into or combined with presently known machine tools.

An additional object of the invention is to provide a tool-changing mechanism whose operation can be programmed and which is sufficiently versatile to permit selective transport of different tools or repeated transport of a given set of tools.

A further object of the invention is to provide a tool-changing mechanism which can transport tools between magazines which can be indexed in a horizontal, vertical or otherwise oriented plane and one or more material-removing stations which must receive tools in such a way that the axes of tools are located in a vertical, horizontal or other plane.

Still another object of the invention is to provide a tool-changing mechanism which is capable of reorientating tools during transport between a tool-storing and a material-removing station or which can be designed in such a way that the orientation of tools remains at least substantially unchanged.

An ancillary object of the invention is to provide a tool-changing mechanism which comprises a small number of relatively simple and rugged parts, which can be operated automatically, semiautomatically, or manually, and wherein the transfer of tools between a stationary tool-storing station and one or more material-removing stations takes up much less time than in presently known mechanisms.

The invention is embodied in a mechanism which serves to transport tools between two stations at least one of which is movable with reference to the other station. The mechanism comprises an expandible and collapsible linkage including first and second pivot means each provided at one of the stations, third pivot means parallel to the first and second pivot means, and first and second link means respectively connecting the first and second pivot means with the third pivot means, a transfer unit mounted on the third pivot means, and tool-gripping means provided on the transfer unit at a point remote from the third pivot means. The gripping means is oscillatable by the transfer unit between a first end position at one of the stations e.g., at the stationary station which can accommodate an indexible tool magazine) and a second end position at the other station e.g., at the movable station which can accommodate a holder for a rotary tool spindle) through angles whose magnitude is a function of the distance between the two stations, i.e., a function of the angle between the first and second link means.

The novel features which are considered as characteristic of the invention are set forth in particular in the appended claims. The improved tool-changing mechanism itself, however, both as to its construction and its mode of operation, together with additional features and advantages thereof, will be best understood upon perusal of the following detailed description of certain specific embodiments with reference to the accompanying drawing. BRIEF DESCRIPTION OF THE DRAWING FIG. 1 is a schematic elevational view of a tool-changing mechanism which embodies one form of our invention and serves to transport tools between a fixedly mounted indexible tool magazine and the movable tool spindle holder of a machine tool;

Figure 3:
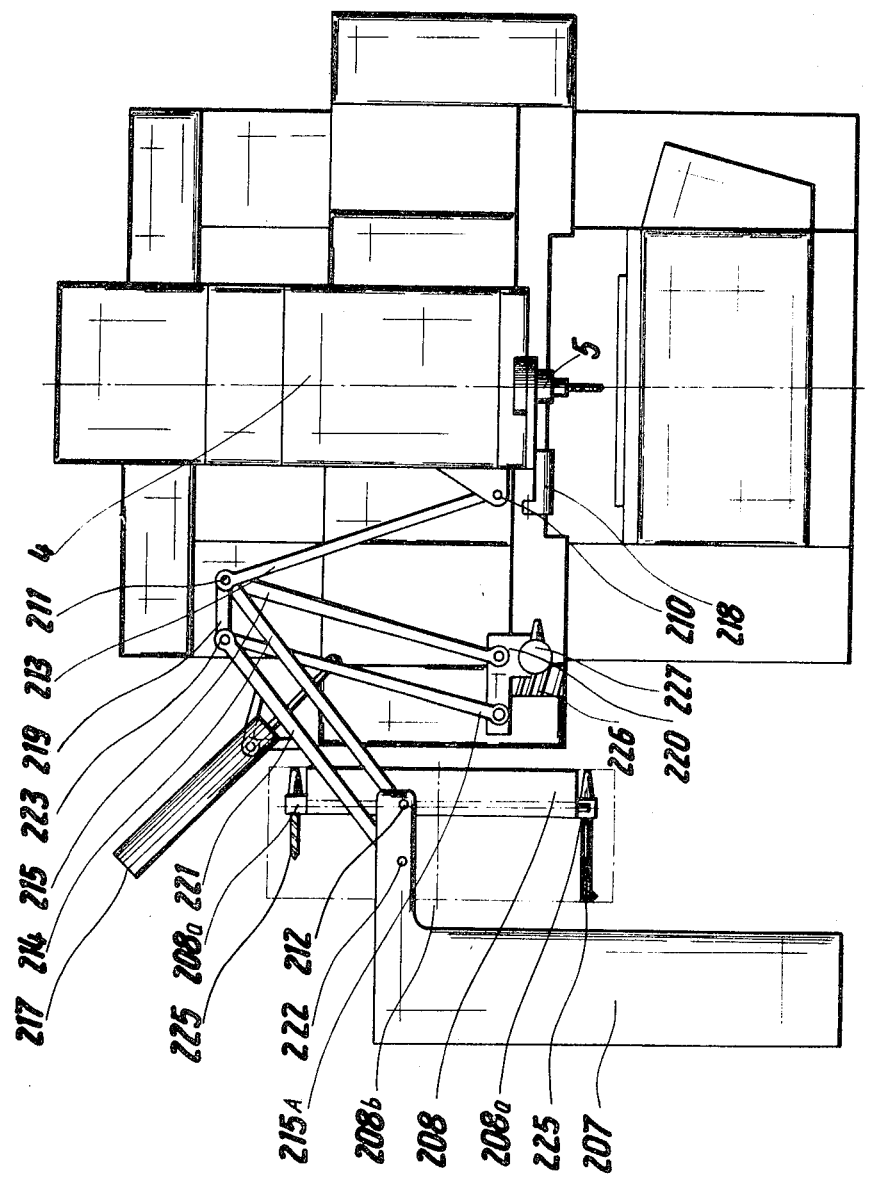
FIG. 3 is a similar schematic elevational view of a third tool-changing mechanism mounted in a machine tool which is similar to that shown in FIG. 1 or 2.
Figure 6:
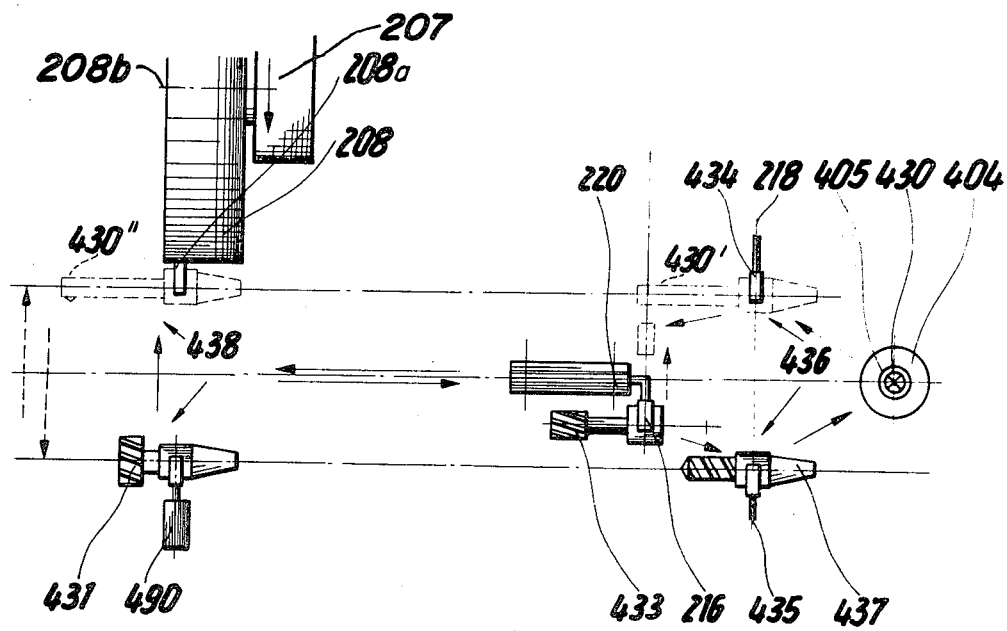
Figure 7:
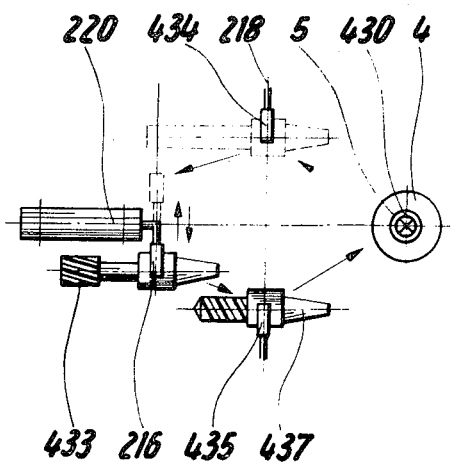

FIG. 6 is a schematic fragmentary elevational view of a machine tool which is similar to the machine tool of FIG. 3 and of a tool-changing mechanism which constitutes a slight modification of the mechanism shown in FIG. 3 and is employed for circulation of four tools between the tool magazine and the tool spindle; and FIG. 7 illustrates a portion of the structure shown in FIG. 6 and three tools which are being circulated between the tool spindle and the gripping means of the tool-changing mechanism.

DESCRIPTION OF THE PREFERRED EMBODIMENTS

Figure 1:
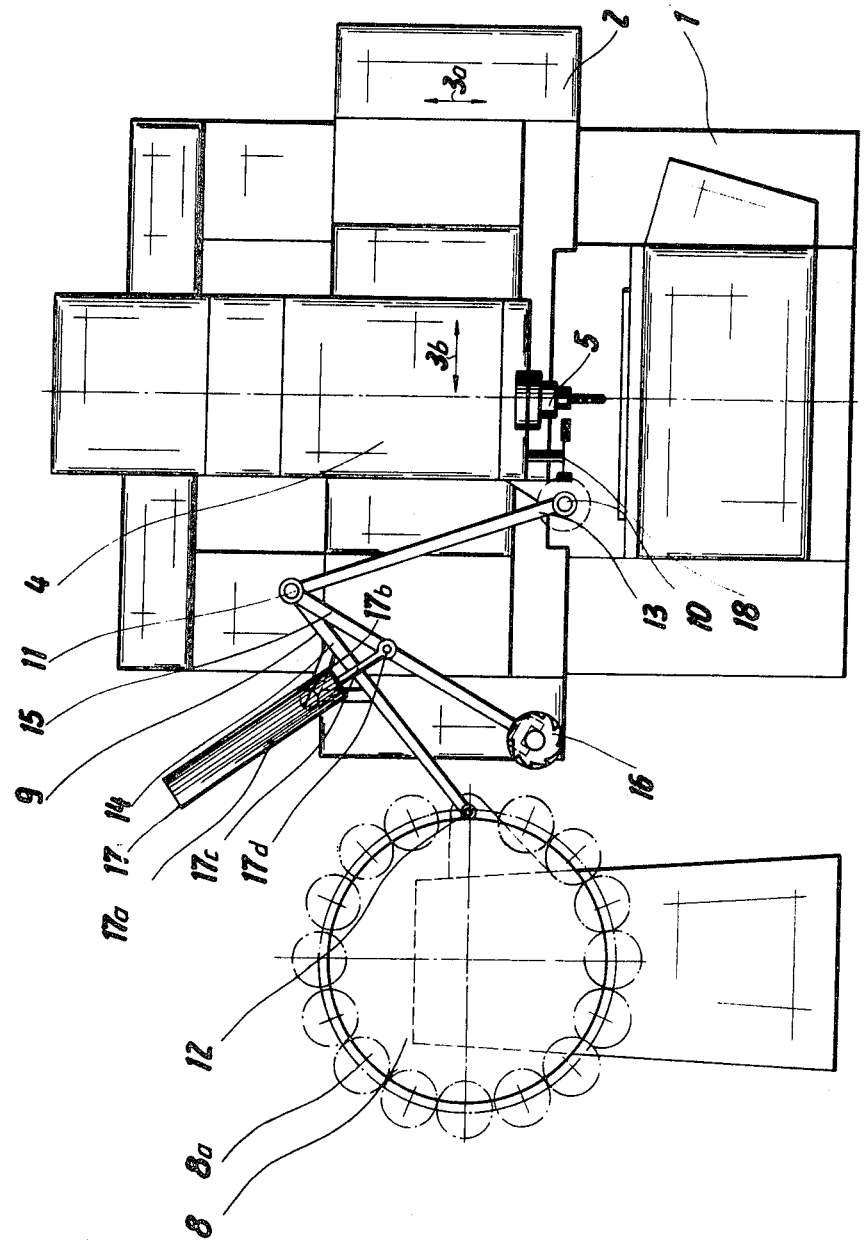

Referring first to FIG. 1, there is shown a tool-changing mechanism which is installed in a machine tool, for example, in a drilling or boring machine having a frame 1, a main slide or carriage 2 which is reciprocable with reference to the frame 1 in directions indicated by a double-headed arrow 3a, and a holder 4 for a tool-receiving spindle 5 which is mounted on the slide 2 and shares all of its movements. The holder 4 is movable with reference to the carriage 2 in directions indicated by the double-headed arrow 3b. A support 7 for an indexible tool magazine 8 is mounted adjacent to or on the frame 1, and the magazine 8 is rotatable about a horizontal axis by an indexing mechanism whose construction forms no part of the present invention.

The improved tool-changing mechanism comprises a linkage 9 having three horizontal pivots 10, 11, 12, two links or arms, 13, 14, an oscillatable transfer unit including a single transfer arm 15 whose free end supports a tool-gripping unit 16, and actuating means 17 serving to pivot the transfer arm 15 about the axis of the pivot 11.

The pivots 10, 12 are respectively mounted on the spindle holder 4 and magazine support 7. The actuating means 17 comprises a double-acting hydraulic or pneumatic assembly whose cylinder 17a is articulately connected to the link 14, as at 17b, and whose piston rod 17c is articulately connected to the transfer arm 15, as at 17d. It is clear that the actuating means 17 may include a rack and pinion drive, a rotary hydraulic or pneumatic motor, an electromagnetic or electrically operated device or any other suitable means capable of pivoting the transfer arm 15 between two end positions in one of which the gripping unit 16 can receive or deliver tools to the magazine 8 and in the other of which the gripping unit can deliver to or receive tools from the tool spindle 5 or from an auxiliary tool-changing device 18 which is mounted on the spindle holder 4 and serves to transport tools between the spindle 5 and the gripping unit 16.

The plane in which the tool spindle 5 is movable with the holder 4 and main slide 2 is normal to the axes of the pivots 10 to 12, and the axis about which the magazine 8 is indexible is parallel to the axes of the pivots 10 to 12. The auxiliary tool-changing device 18 is mounted on and shares all movements of the spindle holder 4, i.e., it shares all translatory movements of the tool spindle 5 with reference to the frame 1. The exact construction of the gripping unit 16 forms no part of the present invention.

It will be readily understood that the gripping unit 16 can transport tools between any selected tool carrier 8a of the magazine 8 and the auxiliary tool-changing device 18 regardless of the distance between the device 18 and the magazine 8. This is due to the fact that the pivot 10 shares all movements of the spindle holder 4 and that the gripping unit 16 can reach the device 18 or the adjoining carrier 8a of the magazine 8 irrespective of the angle between the links 13 and 14. Thus, once the magazine 8 is indexed to place a selected carrier 8a into an optimum position for withdrawal of its tool by the gripping unit 16, the actuating means 17 is operated to move the gripping unit to its left-hand end position so that the latter can accept the tool from the selected carrier 8a. The actuating means 17 is then operated to pivot the transfer arm 15 about the axis of the pivot 11 so that the gripping unit 16 moves into registry with and delivers the freshly accepted tool to the auxiliary tool-changing device 18. The device 18 then delivers the freshly received tool to the tool spindle 5 and, if desired, can simultaneously withdraw the previously employed tool from the tool spindle. The tool which is withdrawn by the auxiliary tool-changing device 18 can be delivered to the gripping unit 16 which thereupon transfers the tool back into an empty carrier 8a of the tool magazine 8. The actuating means 17 is preferably designed in such a way that it can hold the transfer arm 15 and the gripping unit 16 in each of two accurately determined end positions, namely, in a first end position in which the gripping unit registers with a selected carrier 8a and a second end position in which the gripping unit registers with the auxiliary transfer device 18. The accuracy of transfer of tools between the carriers 8a and the auxiliary tool-changing device 18 is not affected by the fact that the transfer might take place while the holder 4 moves with the main slide 2 relative to the frame 1. This is due to the fact that the distance between the device 18 and the tool spindle 5 remains unchanged regardless of the movement of the slide 2 and holder 4 with reference to the frame 1 and support 7. It is clear that the slide 2 and holder 4 can be mounted for movement in a horizontal plane if the axes of the pivots 10 to 12 are vertical, and that the magazine 8 can be indexed about a vertical, horizontal, or otherwise oriented axis irrespective of the inclination of pivots 10 to 12, as long as the magazine can move selected carriers 8a so close to the pivot 12 that the tools in such carriers can be accepted by the gripping unit 16 or that the gripping unit can deliver tools to such carriers.

The auxiliary tool-changing device 18 may include two assemblies one of which is designed to transport tools from the gripping unit 16 to the tool spindle 5 and the other of which is designed to deliver tools to the gripping unit 16 from the tool spindle 5.

Figure 2:
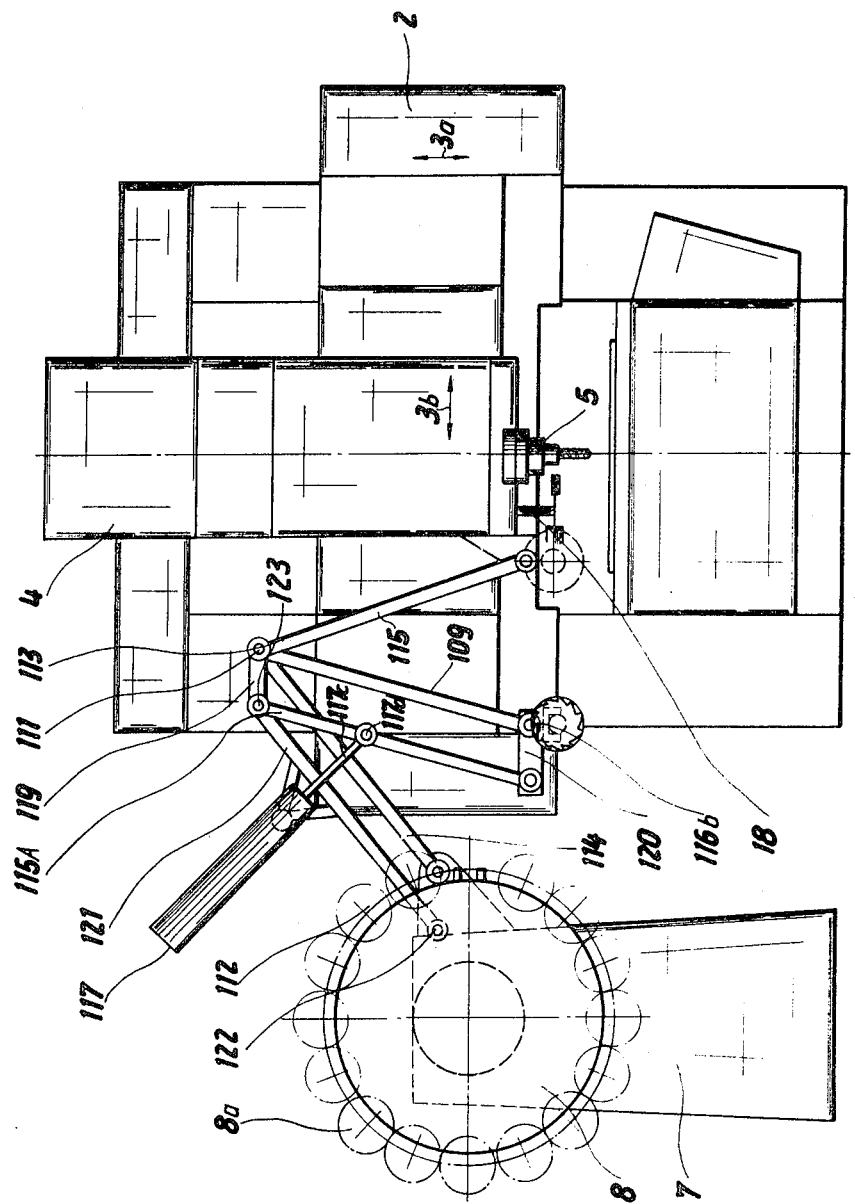
FIG. 2 is a similar schematic elevational view of a second tool-changing mechanism mounted in the machine tool of FIG. 1.

FIG. 2 shows a second tool-changing mechanism which is installed in the machine tool of FIG. 1. The linkage 109 comprises a modified transfer unit which constitutes a parallel motion and ensures that the auxiliary tool-changing device 18 and/or the selected tool carrier 8a can receive tools in a predetermined orientation. The transfer unit comprises two parallel arms 115, 115A, and links 119, 120. The link 120 carries the gripping unit 116. The linkage 109 further comprises a pair of parallel links 114, 121 which replace the link 14 of FIG. 1. The link 121 is turnable on a second pivot 122 mounted on the support 7 and on a pivot 123 mounted on the link 119. The actuating means 117 is mounted on the link 121 and its piston rod 117c is articulately connected to a pivot 117d on the arm 115A.

The same result can be obtained if the pivot 122 is mounted on the spindle holder 4 and if the link 121 extends in parallelism with the link 113. The orientation of a tool which is held by the gripping unit 116 while the arms 115, 115A of transfer unit turn about the pivots 111, 123 remains unchanged. The manner in which the magazine 8 is indexible with reference to the support 7 and the manner in which the auxiliary tool-changing device 18 transports tools between the tool spindle 5 and the gripping unit 116 is the same as described in connection with FIG. 1. The angle between the links 113 and 114 varies when the slide 2 moves in the direction indicated by arrow 3a and/or when the holder 4 moves in the direction indicated by arrow 3b. The numeral 112 denotes the pivot which connects the link 114 to the support 7.

Figure 4:
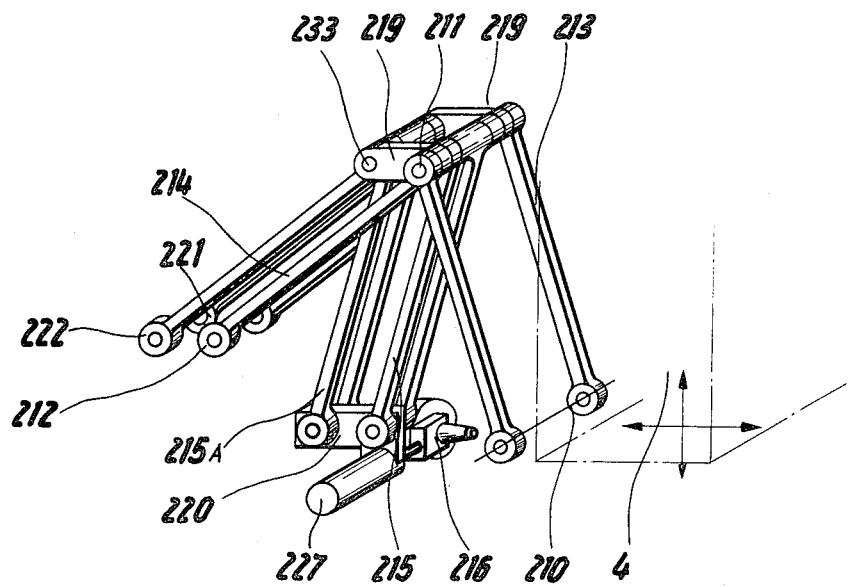
FIG. 4 is a fragmentary perspective view of the mechanism shown in FIG. 3.

FIG. 3 shows a tool-changing mechanism which comprises a twin linkage having pairs of parallel links 213, 214, 221 (see also FIG. 4). The pivots 212, 222 connect the pairs of links 214, 221 to a support 207 which carries a tool magazine 208 indexible about a horizontal axis 208b and having tool carriers 208a for tools 225. The links 213 are coupled to the spindle holder 4 by a pivot 210. The provision of pairwise arranged links 213, 214, 221 enhances the stability of the linkage and ensures more accurate guidance and positioning of the gripping unit 216 which is mounted on the lower link 220 of the transfer unit which again constitutes a parallel motion and further includes pairs of arms 215, 215A and a second pair of links 219. The linkage and/or the transfer unit can be further reinforced by braces which can be provided between the pairs of parts 213, 215, 215A, 214, and/or 221. Furthermore, the transfer unit may be constructed in the same way as shown in FIG. 2 (i.e., with only two arms, a single upper link and a single lower link) and this transfer unit can be mounted between or outwardly adjacent to the links 213, 214, 221. Still further, the transfer unit can include a first parallel motion located between the links of the linkage and one or two additional parallel motions outwardly adjacent to the linkage. In the embodiment of FIGS. 3 and 4, the transfer unit cannot be moved in axial direction of the pivots 210, 211, 223, 212, and 222. A tool 226 is shown in the process of being transferred from the magazine 208 to the auxiliary tool-changing device 218 or vice versa. The actuating means 217 serves to pivot the transfer unit including the arms 215, 215A, the link 220 and the gripping unit 216 about the axes of the pivots 221 and 223. A displacing or second actuating means 227 is mounted on the link 220 and serves to displace the gripping unit 216 with reference to the transfer unit. For example, the displacing means 227 may comprise an electric, hydraulic, or pneumatic motor which can rotate the gripping unit 216 and/or the tool 226 with reference to the link 220 or which can move the unit 216 in parallelism with the axes of the pivots. Also, the displacing means 227 can be designed to effect movements of the gripping unit 216 in several directions; for example, and assuming that the auxiliary tool-changing device 218 is omitted, the displacing means 227 can be designed to orient the tool 226 in such a way that the latter can be inserted directly into the tool spindle 5. Thus, the auxiliary device 218 constitutes an optional feature of our tool-changing mechanism.

Figure 5:
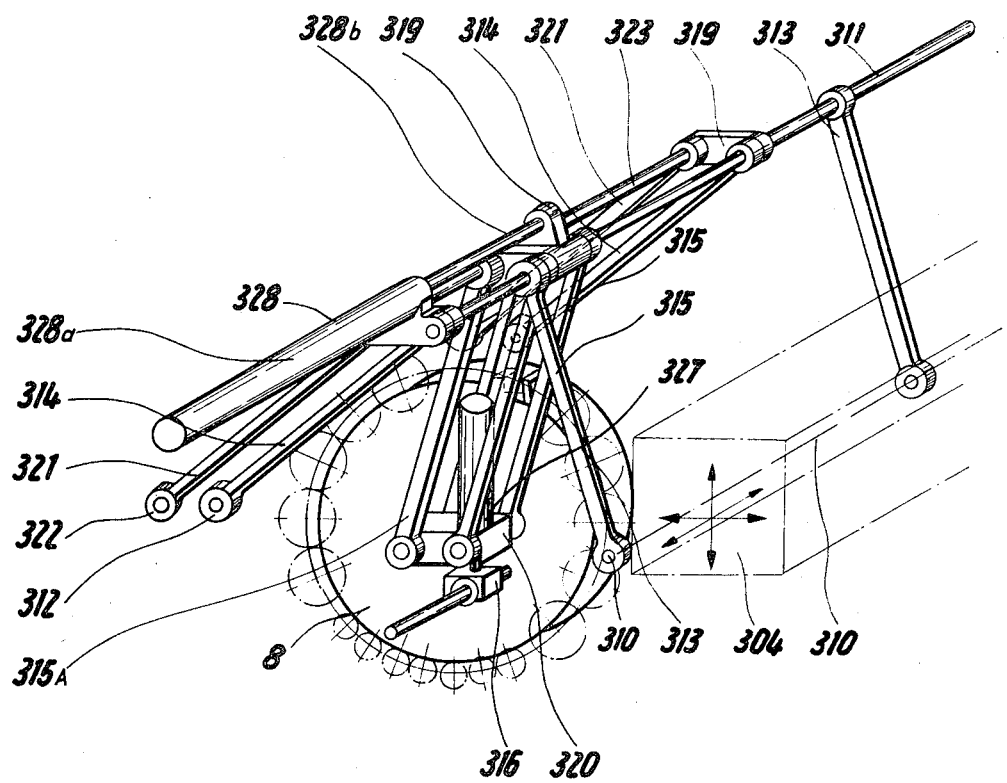
FIG. 5 is a similar fragmentary perspective view of a fourth tool-changing mechanism.

FIG. 5 shows a fourth tool-changing mechanism wherein all such parts which are clearly analogous to the parts of the mechanism shown in FIGS. 3 and 4 are denoted by similar reference numerals plus 100. The main difference is that the two halves of the dual linkage are spaced apart and that the parallel motion of the transfer unit is movable axially of the pivots 331, 323 by a second displacing means 328, e.g., a fluid-operated cylinder and piston assembly whose cylinder 328a is attached to the pivot 311 and whose piston rod 328b is connected to the upper link 319 of the transfer unit. The displacing means 327 serves to move the gripping unit 316 up and down with reference to the lower link 320 of the transfer unit. The actuating means which turns the transfer unit about the pivots 311, 323 has been omitted for the sake of clarity. In the embodiment of FIG. 5, the magazine 8 has been placed between the reciprocable spindle holder 304 and the pivots 312, 322. The parallel motion of the transfer unit is similar to that shown in FIG. 4. It is clear that at least one of the fluid-operated displacing means 327, 328 can be replaced by electrically or otherwise operated displacing means.

Referring now to FIG. 6, there is shown a portion of a tool-changing mechanism which is similar to the mechanism of FIG. 3 with the exception that the tool spindle 405 rotates in its holder 404 about an axis which is normal to the plane of oscillatory movement of the linkage. Thus, if the transfer unit (represented by the lower link 220) is movable in a vertical plane, the axis of the tool 430 in the tool spindle 405 is horizontal. The magazine 208 is indexible about the horizontal axis 208b. The numeral 207 denotes the support for the magazine 208, and a carrier for tools is shown at 208a. The gripping unit 216 supports a tool 433. The auxiliary tool-changing device 218 comprises two transporting assemblies 434, 435. An additional transfer device 490 is movable to remove tools from the carrier 208a. The device 490 holds a tool 431. The operation of the tool-changing mechanism is programmed so that the assemblies 434, 435, the actuating means 217 (not shown), the displacing means 227 (not shown), the indexing means for the magazine 208, the device 490, the spindle holder 404 and the spindle 405 can be started, arrested, and moved in accordance with a predetermined schedule.

The operation:

The assemblies 434, 435 are held ready at the station 436. The assembly 434 is thereupon caused to move into registry with the tool spindle 405 and to accept and remove the previously used tool 430. The assembly 434 then returns to the illustrated position and maintains the freshly removed tool 430 in the dotted-line position 430'. The means for moving the assembly 434 with reference to the spindle holder 404 may include one or more motors which effect rotary and/or translatory movements of the assembly 434. The withdrawal of tool 430 from the spindle 405 can take place in response to axial movement of the spindle with reference to the assembly 434 and/or vice versa.

The assembly 435 supports a fresh tool 437 which can be transferred into the spindle 405 immediately after the assembly 434 reassumes the illustrated position or while the assembly 434 transports the previously used tool 430 to the position 430'. The assembly 435 is thereupon disengaged from the tool 437 and returns to the position shown in FIG. 6, i.e., it is again located at the station 436.

The tool 430 (in the position 430') is engaged by the gripping unit 216 of the transfer unit and is transported to the magazine 208 to be introduced into the carrier 208a and to assume the broken line position 430''. During return movement toward the station 436, the gripping unit 216 transports the fresh tool 431 from the device 490 at the station 438 to the assembly 435 at the station 436. It is assumed that the tool 433 is transferred to the assembly 435 before the unit 216 moves toward the station 438, i.e., before the unit 216 accepts the tool 430 (in the position 430') and moves it to the carrier 208a (position 430''). The assembly 434 is ready to transfer the tool 437 from the spindle 405 to the station 436.

The auxiliary device 218 may be provided with a single transporting assembly (434 or 435) which is then designed to transport tools to and from the tool spindle 405. However, the arrangement of FIG. 6 is particularly suited for use in programmed machine tools because the replacement of tools in the tool spindle 405 requires very little time, i.e., the assembly 435 can transport a fresh tool toward the spindle while the assembly 434 removes and/or transports the previously used tool away from the spindle. The operation of the assemblies 434, 435 is preferably synchronized in any suitable way, e.g., by conventional electrical, electromagnetic, mechanical, pneumatic or hydraulic means. The same holds true for the device 490 at the station 438. The transfer of a tool from a given carrier 208a into the tool spindle 405 takes place in three stages, namely from the carrier 208a to the device 490 at the station 438, from the station 438 to the station 436 (gripping unit 216), and from station 436 to the spindle (assembly 435 of the device 216). Return movement of a tool from the spindle 405 to a carrier 208a is performed in two stages (assembly 434 and the gripping unit 216).

If the requirements of the machine tool are such that a set of say four tools must be used repeatedly in a given sequence in the course of a machining operation, the tool-changing mechanism can be designed in the same way as shown in FIG. 6. The magazine 208 need not be indexed at all, i.e., it maintains a carrier 208a in the position shown in FIG. 6. The four tools to be used in a predetermined sequence are the tools 430, 431, 433, and 437. The device 490 at the station 438 merely withdraws tools from the carrier 208a and holds such tools ready for the unit 216. The sequence in which the tools are inserted into the spindle 405 is as follows: 437, 433, 431, 430, 437, 433, 431, 430....

Alternatively, the tools 430, 437, 433, 431 need only be transported into the carriers 208a of the magazine 208. Such tools are then simply circulated from the spindle 405, to the device 218, to the carrier 208a. The device 490 at the station 438, will withdraw them from the carrier 208a, to the other assembly of such device, to the assembly 435, and back to the spindle 405. Thus, four tools can be circulated without necessitating any indexing of the magazine 208 using the carriers 208a of the magazine as intermediate station only.

As shown in FIG. 7, the structure of FIG. 6 can be utilized for circulation of three tools (e.g., the tools 430, 433, 437) along an endless path. The linkage of the tool-changing mechanism is then at a standstill and the magazine 208 (not shown in FIG. 7) remains idle. The auxiliary tool-changing device 218 merely transports tools between the tool spindle 405 and the gripping unit 216 and the latter transports tools between the assemblies 434, 435 so that the tools are circulated in the sequence 437, 433, 430, 437, 433, 430....

It is clear that the structure of FIG. 7 can be used with equal advantage for circulation of two tools, for example, the tools 430, 437. As stated before, the tool-changing mechanism preferably comprises means for holding the gripping unit in each of its end positions, or at least in that position in which the gripping unit is adjacent to the auxiliary tool-changing device. Such holding action can be performed by the actuating means or by a separate holding device.

The utilization of our improved tool-changing mechanism in a machine tool brings about substantial savings in tool-changing times even if the tool spindle must be moved to a predetermined position prior to reception or removal of a tool. This is due to the fact that the movements of the tool spindle with reference to the tool-changing mechanism are relatively short because the tool-changing mechanism is capable of compensating for the major part of displacements of the tool spindle with reference to the magazine. Another important advantage of the improved tool-changing mechanism is that its linkage automatically collapses or expands in response to movement of the spindle holder with reference to the magazine; therefore, the transfer unit of the tool-changing mechanism can transport tools while the spindle holder is in motion. If the tool-changing mechanism comprises two or more transfer units which are supported by a common linkage, each such transfer unit can be moved by separate actuating means so that the transfer units can simultaneously transport two or more tools in the same direction or in different directions and at identical or at different speeds. Reference may be had, for example, to FIG. 4, wherein one of the links 215, one of the links 215A and the link 220 may constitute a first transfer unit whereas the other link 215 and the other link 215A can form part of a second transfer unit which further includes a third link (corresponding to the link 220) and carries a second gripping unit which is identical with or different from the gripping unit 216. Such tool-changing mechanism can be provided with two actuating means, one for each of the two transfer units.

The gripping unit or units of the improved tool-changing mechanism can transport the tools in any desired orientation, preferably in such a way that the axis of the transported tool is located in the plane of movement of the transfer unit (as shown in FIG. 3). However, it is equally possible to transport the tools in such a way that their axes are parallel to the plane of movement of the transfer unit or that their axes are normal to such plane (see FIG. 1 wherein the axis of the tool carried by the gripping unit 16 is normal to the plane of the drawing in which the arm 15 oscillates about the axis of the pivot 11).

As stated above, the gripping unit can be designed to transport tools directly into and to remove tools directly from the tool spindle. Such types of tool-changing mechanism are particularly suited for use in machine tools wherein the tool spindle rotates about a horizontal axis and wherein the magazine is also indexible about a horizontal axis which is parallel to the axis of the spindle. In such types of tool-changing mechanisms, the gripping unit is preferably mounted in such a way that it is movable in axial direction of the spindle, i.e., that it can insert or withdraw tools from the carriers of the tool magazine and that it can also insert and withdraw tools from the tool spindle. The displacing means 328 of FIG. 5 can move the gripping unit 316 in axial direction of the magazine 8 and in axial direction of the tool spindle, i.e., the structure of FIG. 5 can be used to transport tools directly from a horizontal tool spindle into the carriers of the magazine 8, or vice versa.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of our contribution and, therefore, such adaptations should and are intended to be comprehended within the meaning and range of equivalence of the claims.

What is claimed as new and desired to be protected by Letters Patent is set forth in the appended claims:

1. A mechanism for transporting tools between two stations at least one of which is movable with reference to the other station, comprising an expandible and collapsible linkage including first and second pivot means each provided at one of said stations, third pivot means parallel with said first and second pivot means, and first and second link means respectively connecting said first and second pivot means with said third pivot means; a transfer unit mounted on said third pivot means; and tool-gripping means provided on said transfer unit at a point remote from said third pivot means, said gripping means being oscillatable by said transfer unit between a first position at one of said stations and a second position at the other station through angles whose magnitude is a function of the distance between said stations.

2. A mechanism as defined in claim 1, further comprising actuating means for turning said transfer unit about the axis of said third pivot means.

3. A mechanism as defined in claim 1, wherein one of said link means comprises a parallel motion.

4. A mechanism as defined in claim 1, wherein said transfer unit comprises a parallel motion.

5. A mechanism as defined in claim 4, wherein one of said link means comprises a parallel motion.

6. A mechanism as defined in claim 1, wherein each of said link means comprises a plurality of links.

7. A mechanism as defined in claim 1, wherein said link means comprises two sets of links spaced from each other in the axial direction of said pivot means and wherein said transfer unit is oscillatable between said sets of links.

8. A mechanism as defined in claim 1, wherein said link means comprises several sets of links spaced from each other in the axial direction of said pivot means and including two outer sets, said transfer unit being outwardly adjacent to one of said outer sets.

9. A mechanism as defined in claim 1, wherein said gripping means is movable with reference to said transfer unit and further comprising displacing means for moving said gripping means with reference to said transfer unit.

10. A mechanism as defined in claim 9, wherein said displacing means is arranged to move said gripping means in parallelism with the axes of said pivot means.

11. A mechanism as defined in claim 9, wherein said gripping means is turnable with reference to said transfer unit.

12. A mechanism as defined in claim 1, wherein said transfer unit is oscillatable in a predetermined plane and wherein said gripping means is arranged to hold tools in such positions that the axes of tools held by said gripping means are at least substantially parallel to said plane.

13. A mechanism as defined in claim 1, wherein said transfer unit is oscillatable in a plane which is normal to the axes of said pivot means and wherein said gripping means is arranged to hold tools in such positions that the axes of tools held by said gripping means are located in said plane.

14. A mechanism as defined in claim 1, wherein said gripping means is arranged to hold tools in such positions that the axes of tools held by said gripping means are at least substantially parallel to the axes of said pivot means.

15. A mechanism as defined in claim 1, further comprising auxiliary tool changing means provided at least at one of said stations and including at least one assembly for receiving tools from and for delivering tools to said gripping means.

* * * * *